United States Patent
Qin et al.

(10) Patent No.: US 9,652,045 B2
(45) Date of Patent: May 16, 2017

(54) ELECTRONIC APPARATUS AND METHOD FOR CONTROLLING RESPONSE

(71) Applicant: Lenovo (Beijing) Co., Ltd., Beijing (CN)

(72) Inventors: Yue Qin, Beijing (CN); Wei Su, Beijing (CN); Shurong He, Beijing (CN); Ran Zhang, Beijing (CN); Yingjia Yao, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 151 days.

(21) Appl. No.: 14/641,057

(22) Filed: Mar. 6, 2015

(65) Prior Publication Data
US 2016/0085504 A1   Mar. 24, 2016

(30) Foreign Application Priority Data

Sep. 19, 2014   (CN) .......................... 2014 1 0484180
Sep. 28, 2014   (CN) .......................... 2014 1 0510611

(51) Int. Cl.
*G06F 3/16*   (2006.01)
*G06F 3/01*   (2006.01)
*G06F 1/16*   (2006.01)

(52) U.S. Cl.
CPC ............ *G06F 3/017* (2013.01); *G06F 1/1624* (2013.01); *G06F 1/1677* (2013.01); *G06F 3/165* (2013.01)

(58) Field of Classification Search
CPC ........ G06F 3/017; G06F 3/165; G06F 1/1624; G06F 1/1677

USPC ........................................................ 345/156
See application file for complete search history.

(56) References Cited

U.S. PATENT DOCUMENTS

| | | | |
|---|---|---|---|
| 2007/0270193 A1* | 11/2007 | Hsieh .................. | H04M 1/0237 455/575.1 |
| 2010/0073854 A1* | 3/2010 | Jeong .................. | H04M 1/0237 361/679.01 |
| 2010/0099463 A1* | 4/2010 | Kim ...................... | G06F 1/1624 455/566 |
| 2011/0001715 A1* | 1/2011 | Cha ...................... | H04M 1/0247 345/173 |
| 2011/0095976 A1* | 4/2011 | Hwang ................. | G06F 1/1622 345/156 |
| 2012/0028692 A1* | 2/2012 | Nishizono ............. | H01Q 1/243 455/575.1 |

* cited by examiner

*Primary Examiner* — Andrew Sasinowski
*Assistant Examiner* — Chineyere Wills-Burns
(74) *Attorney, Agent, or Firm* — Brinks Gilson & Lione; G. Peter Nichols

(57) ABSTRACT

An electronic apparatus is described and includes a first body; a second body; and at least two connecting devices, wherein the first body is connected with the second body in a slidable manner through the at least two connecting devices. The first body slides to a first state relative to the second body through the at least two connecting devices, and the first body slides to a second state relative to the second body through the at least two connecting devices. The first state is a first limit position of the sliding distance provided by the at least two connecting devices that the first body slides relative to the second body, and the second state is a second limit position of the sliding distance provided by the at least two connecting devices that the first body slides relative to the second body.

27 Claims, 10 Drawing Sheets

ELECTRONIC APPARATUS AND METHOD FOR CONTROLLING RESPONSE

This application claims priority to Chinese patent application No. CN 201410510611.0 filed on Sep. 28, 2014 and to CN 201410484180.5 filed on Sep. 19, 2014, the entire contents of which are incorporated herein by reference.

BACKGROUND

The present application relates to a field of electronic technology, and in particular to an electronic apparatus and a method for controlling response.

In recent years, with a rapid development of computer, network and communication technologies, a variety of smart electronic apparatuses (such as a mobile phone, a tablet computer or a wearable device or the like) is developing fast. In the meanwhile, a user's requirement for usage experience of an electronic apparatus is constantly rising. The existing electronic apparatuses mainly performs a human-computer interaction through a gesture input performed by an operation body on touch screen instead of the original physical keying input, so that the user feels more simple and comfortable in the process of using.

The smart electronic apparatus having a touch display screen, for example a mobile phone, a tablet computer or the like, is a complete entirety. Then, the user performs an input of an instruction or a gesture just by touching the display screen, so as to control the smart electronic apparatus. This interaction mode is single, and thus the smart electronic apparatus has a low efficiency of use. In addition, it is clear that the development of the smart electronic apparatus has already entered a bottleneck period. For example, the touch display screen of the smart electronic apparatus is growing large, and is integrated with more sensors. However, the smart electronic apparatus is still housed by an entire shell, and there is no innovation in a product form. In the existing electronic apparatuses, due to more independence upon applications, it is possible that a problem of operation delay caused by not enough fast response of software will occur.

SUMMARY

According to first aspect, an embodiment of the present application provides an electronic apparatus, comprising: a first body; a second body arranged on the first body in a superimposed manner and being capable of performing a relative movement relative to the first body; a detection device configured to detect the relative movement performed by the first body relative to the second body and obtain a detection result; a control device configured to control the electronic apparatus to perform a predetermined function based on the detection result.

According to a second aspect, an embodiment of the present application provides a method for controlling response, comprising: detecting a relative movement performed by the first body of the electronic apparatus relative to the second body and obtaining a detection result; and controlling the electronic apparatus to perform a predetermined function based on the detection result.

According to a third aspect, an embodiment of the present application provides an electronic apparatus, comprising: a body device, a first input device, a voice collecting device, a detection device and a control device. The first input device is flexibly connected with the body device through the connecting devices. The first input device is forced to generate a relative movement relative to the body device in a case that an external force is applied to the first input device. The voice collecting device is configured to collect voice. The detection device is located in the body device, and is configured to obtain a motion parameter that the first input device performs a relative movement relative to the body device and determine a first relative movement direction that the first input device generates the relative movement relative to the body device according to the motion parameter. The first relative movement direction is used to represent a first input direction of an operation input formed in a way that the operation body controls the first input device to move relative to the body device. The control device may be located in the body device, and configured to determine an initiating instruction based on the first relative movement direction, and at least control the voice collecting device to be in an enabled state in response to the initiating instruction, so as to collect voice input by the user of the electronic apparatus.

BRIEF DESCRIPTION OF THE DRAWINGS

In order to describe the embodiments of the present disclosure or the technical solutions in the related art more clearly, hereinafter, the accompany drawings necessary to be used in the description of the embodiments will be introduced briefly. Apparently, the accompany drawings in the following description are only some embodiments of the present disclosure.

DETAILED DESCRIPTION

In order to make the purpose, the technical solutions of the present application more clearly, the present application is further described in detail by taking embodiments as examples and making reference to the figures.

An electronic apparatus according to an embodiment of the present application may comprise: a first body; a second body arranged on the first body in a superimposed manner and being capable of performing a relative movement relative to the first body; a detection device configured to detect the relative movement performed by the first body relative to the second body and obtain a detection result; and a control device configured to control the electronic apparatus to perform a predetermined function based on the detection result. The first body may comprise a display screen. The control device controls the display screen to output a predetermined display when the detection result obtained by the detection device indicates that the second body performs sliding operation relative to the first body. The first body is used as a first input device of the electronic apparatus. The first input device is capable of generating the relative movement relative to the body device when being applied an external force.

The electronic apparatus further comprises a voice collecting device configured to collect a voice input. The detection device may be located in the second body and configured to obtain a motion parameter that the first input device performs the relative movements relative to the second body, and determine a first relative movement direction that the first input device generates the relative movement relative to the second body according to the motion parameter. The first relative movement direction is used to represent a first input direction of an operation input formed in a way that the first input device relatively moves relative to the second body under a control of the operation body. The control device may be located in the second body, and configured to determine an initiating instruction based on the first relative movement direction and at least control the voice collecting device to be in an enabled state in response to the initiating instruction, so as to collect the voice input performed by the user of the electronic apparatus.

Figure 1:
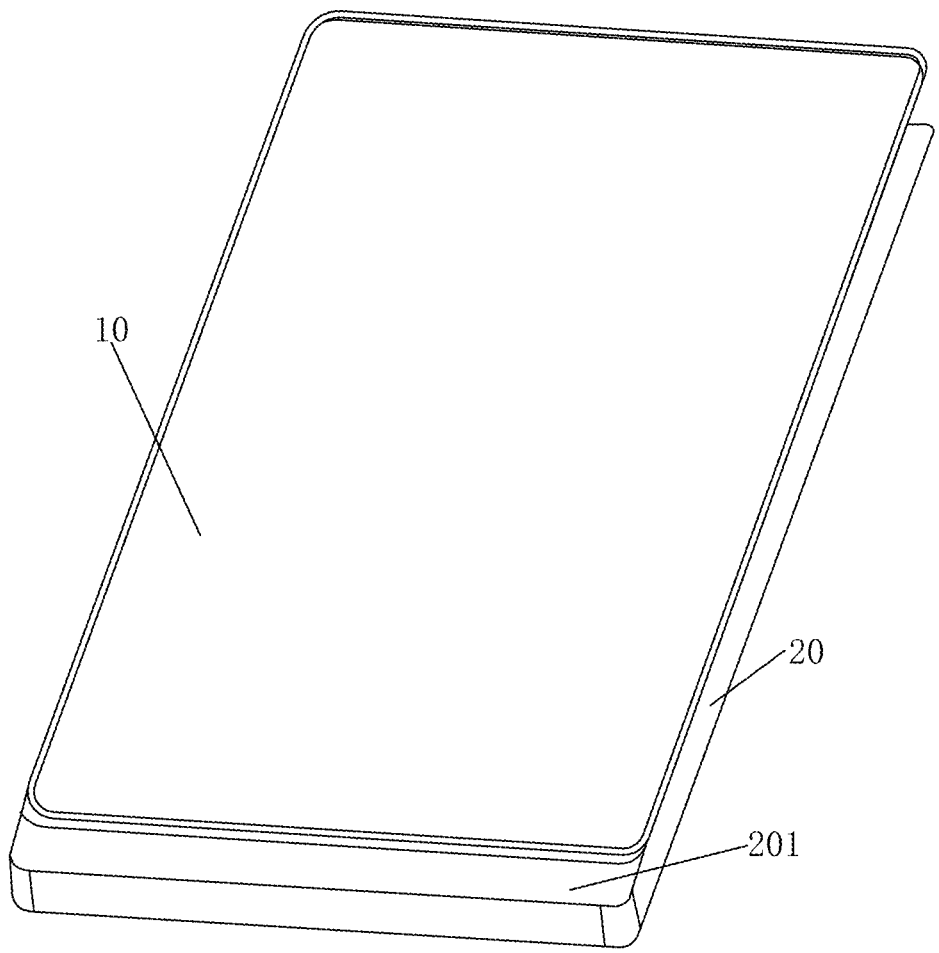
FIG. 1 is a schematic diagram of a composition structure of a first electronic apparatus according to an embodiment of the present application.

FIG. 1 is a schematic diagram of a composition structure of a first electronic apparatus according to an embodiment of the present application. As shown in FIG. 1, the first electronic apparatus according to the embodiment of the present application comprises: a first body 10, a second body 20 and at least two connecting devices. The first body 10 and the second body 20 are arranged in a superimposed manner, the at least two connecting devices are located between the first body 10 and the second body 20, and the first body is connected with the second body 20 in a slidable manner though the at least two connecting devices. The first body performs a relative movement relative to the second body. At this time, the first body acts as a first input device of the first electronic apparatus. Through an implementation of the first body acting as the first input device, a user of the first electronic apparatus forces the first body to generate a relative movement relative to the second body by applying an external force to the first body. The first electronic apparatus obtains a motion parameter that the first body performs the relative movement relative the second body, and generates a control instruction according to the motion parameter, so that the first electronic apparatus makes a response.

The first electronic apparatus according to another embodiment of the present application further comprises a display screen and a second input device. A sensing area of the second input device and a display output area of the display screen are overlapped. The display screen and second input device belong to the first body, and both the display area and the sensing area are exposed through the first body. Then the first body acting as the first input device further comprises the second input device. The first electronic apparatus generates the control instruction through the first input device and the second input device, so that the first electronic apparatus makes a response. For example, when the user of the first electronic apparatus forces the first body to perform the relative movement relative to the second body by applying the external force to the first body, fingers of the user acting as the operation body must apply the external force at a sensing point within the sensing area, then the sensing area (the second input device) certainly obtain a contact sensing point, or a pressure sensing point. Then, the first electronic apparatus may determine the control instruction by the obtained sensing point of the second input device as well as the motion parameter of the relative movement of the first body relative to the second body together. Or, the first electronic apparatus may determine one input action of the user or the control instruction corresponding to the user's one input action by the obtained sensing point of the second input device as well as the motion parameter of the relative movement of the first body relative to the second body together.

In the embodiment of the present application, the first electronic apparatus may be a mobile phone, a game console, a tablet computer or the like. In particular, the mobile phone may be a sliding phone having the display screen and the sliding function of the host part.

Figure 2:
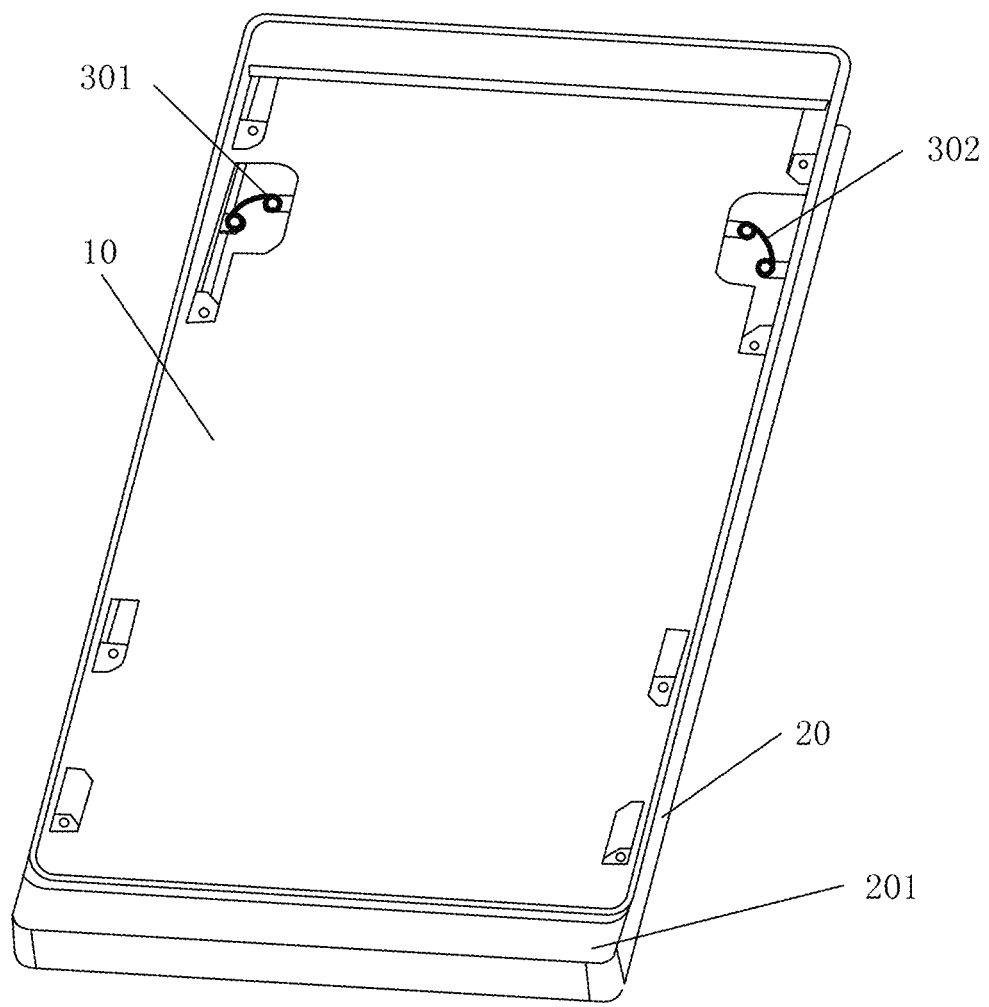
FIG. 2 is a schematic diagram of a position of a connecting device in a first electronic apparatus according to an embodiment of the present application.

FIG. 2 is a schematic diagram of a position of a connecting device in the first electronic apparatus according to an embodiment of the present application. As shown in FIG. 2, the at least two connecting device may be a first connecting device 301 and a second connecting device 302, respectively. The first connecting device 301 and the second connecting device 302 are symmetrically arranged and have the same structure. A sliding distance provided by the first connecting device 301 is the same as a sliding distance provided by the second connecting device 302.

The first body 10 is connected with the second body 20 in a slidable manner through the at least two connecting devices. The first body 10 slides to a first state relative to the second body 20 through the at least two connecting devices, and slides to a second state relative to the second body 20 through the at least two connecting devices. The first state is a first limit position of the sliding distance provided by the at least two connecting device that the first body 10 slides relative to the second body 20. The second state is a second limit position of the sliding distance provided by the at least two connecting device that the first body 10 slides relative to the second body 20.

In the embodiment of the present application, the at least two connecting devices may be four connecting devices. These connecting devices are symmetrically arranged between the first body 10 and the second body 20. In other words, it may be as shown in FIG. 2 that the first connecting device 301 and the second connecting device 302 are arranged symmetrically along a central axis of the first electronic apparatus. As an implementation, when the at least two connecting devices comprises two connecting devices, the two connecting device may also be arranged symmetrically along a diagonal line of the first electronic apparatus, i.e., the two connecting device are arranged symmetrically along a center of the first electronic apparatus. When the connecting devices are arranged symmetrically, the first body 10 will slide more stably relative to the second body 20.

When the at least two connecting devices comprise four connecting devices. The four connecting devices may be arranged symmetrically along the two axes of the first electronic apparatus, respectively. Of course, in this case, the four connecting devices are also arranged symmetrically along the center of the first electronic apparatus. It should be noted that the sliding distances provided by the four connecting devices are the same when the number of the connecting devices is four.

In the embodiment of the present application, the first body 10 and the second body 20 of the first electronic apparatus are connected through the at least two connecting devices. The first state is the first limit position of the sliding distance provided by the at least two connecting devices that the first body 10 slides relative to the second body 20. The second state is the second limit position of the sliding distance provided by the at least two connecting devices that the first body 10 slides relative to the second body 20. The first limit position corresponds to an upper end of a sliding chute provided by the connecting devices, and the second limit position corresponds to a lower end of the sliding chute provided by the connecting devices. Or, the first limit position corresponds to the lower end of the sliding chute provided by the connecting devices, and the second limit position corresponds to the upper end of the sliding chute provided by the connecting devices.

In the embodiment of the present application, a distance value of the sliding distance provided by the at least two connecting devices is less than a length value of a first edge of the first body 10 arranged corresponding to the at least two connecting devices. Or the distance value of the sliding distance provided by the at least two connecting devices is less than a length value of a first edge of a second body 20 arranged corresponding to the at least two connecting devices.

Since the connecting devices are arranged at the two mutually symmetric sides of the first body 10 or the second body 20, a sliding route provided by the connecting devices will be less than a length of a side of the first body 10 or the second body 20 arranged. When the at least two connecting devices comprise four connecting devices symmetrically arranged, each side of the first body 10 or the second body 20 is arranged with two connecting devices. At this time, the sliding route provided by the connecting devices will be less than a half of the length of the side at which the connecting devices are arranged. In other words, if the connecting devices are arranged at a long side of the first body 10 or the second body 2, then the sliding route provided by the connecting devices is less than a half of the long side. If the connecting devices are arranged at a short side of the first body 10 or the second body 20, then the sliding route provided by the connecting devices is less than a half of the short side.

In the embodiment of the disclosure, an upper surface 201 of the second body 20 is an upper surface formed by extending in the sliding distance along the first edge starting from a second edge on which the at least two connecting devices are not arranged, so as to ensure exposure of an upper surface of the second body 20 when the first body 10 slides to the first state relative to the second body 20, or ensure exposure of the upper surface of the second body 20 when the first body 10 slides to the second state relative to the second body 20. As shown in FIGS. 1 and 2, the upper surface of the second body 20 is exposed when the first body 10 is pushed upwards relative to the second body 20 through the at least two connecting devices.

Figure 3:
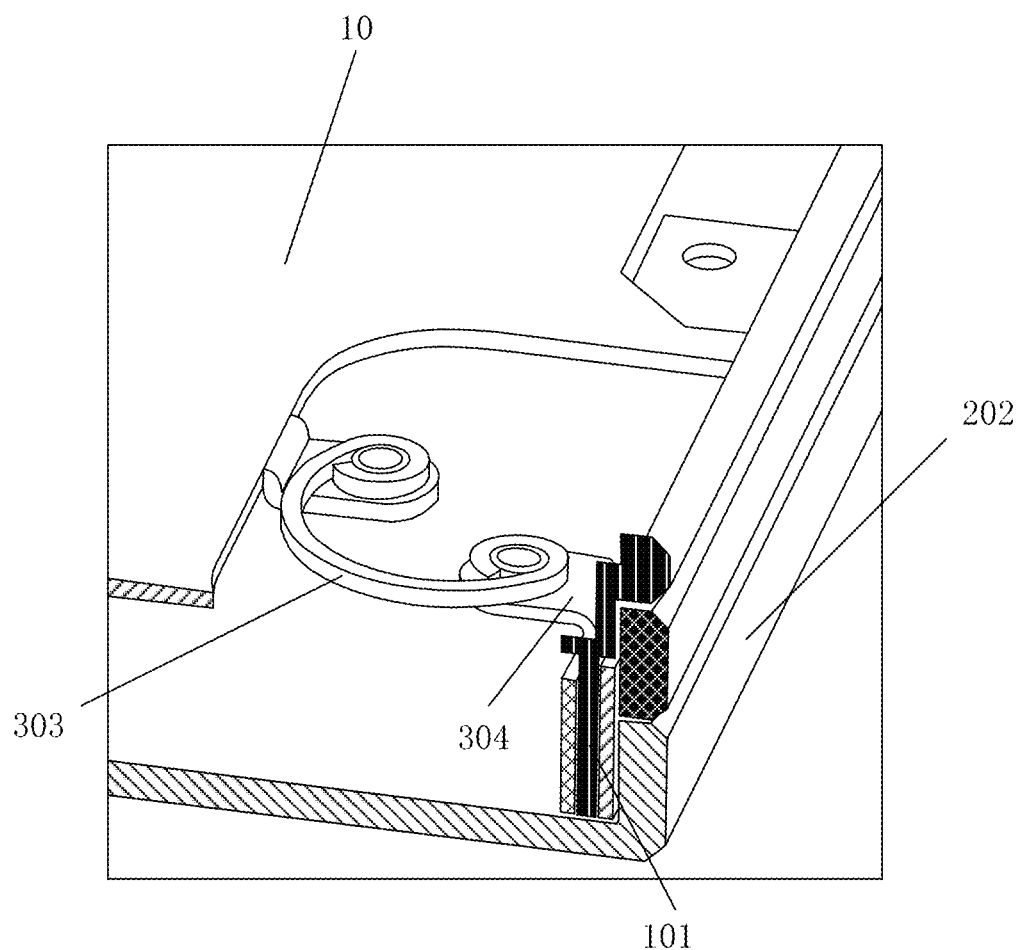
FIG. 3 is schematic diagram of a composition structure of a connecting device of a first electronic apparatus according to an embodiment of the present application.

FIG. 3 is schematic diagram of a composition structure of the connecting device of the first electronic apparatus according to an embodiment of the present application. As shown in FIG. 3, the lower surface of the second body 20 has a first shape. The lower surface of the second body 20 extends upwards to form a side wall of the second body 20. The lower surface of the second body 20, the side wall of the second body 20 and the upper surface of the second body 20 constitute a first accommodating space. A first connector 304 of the first connecting device is fixed on the first side wall to form a slideway. The lower surface of the first body 10 has a second shape. The lower surface of the first body 10 extends upwards to form a side wall of the second body 20. The lower surface of the first body 10 and the side wall of the first body 10 constitute a second accommodating space. A position of the lower surface of the first body 10 that corresponds to the connecting devices extends downwards to form a bulge 101. The bulge 101 is accommodated inside the slideway. The length of the first connector is the sliding distance provided by the first connecting device.

In the embodiment of the present application, the first electronic apparatus further may comprise M electrical elements disposed inside the first accommodating space and the second accommodating space respectively. The M electrical elements comprise: a sensor configured to obtain the relative movements of the first body 10 and the second body 20; and a processor configured to determine a corresponding response instruction according to the obtained relative movements of the first body 10 and the second body 20.

The first electronic apparatus performs the response instruction to control a change of output content of the first electronic apparatus. Examples of the change of output content described in the embodiment of the present application are given below. A first type of examples relate to a display output. An example 1.1 is a switching or a changing of different display interfaces of the same application. Then, a switching instruction or a changing instruction that may be executed by the first electronic apparatus is the response instruction. An example 1.2 is a switching or a changing of display interfaces of different applications. Then, a switching instruction or a changing instruction that may be executed by the first electronic apparatus is the response instruction. An example 1.3 is a changing of a display effect of a display interface or display content, i.e., the changing of display effect parameters such as size, luminance, color, and transparency, and so on. Then, the instruction of adjusting the display effect parameters is the response instruction. A second type of examples relate to the voice output. An example 2.1 is the switching or the changing of audio data. Then, the switching instruction or the changing instruction is the response instruction. An example 2.2 is an output effect of the audio data output, i.e., changing the audio output effect parameters such as volume level and so on. Then, the instruction of adjusting the audio output effect parameters is the response instruction. The change of the output content described in the embodiment of the present application may be changing the output of display and voice simultaneously, for example, viewing video content (including image and voice) through a video play application, and triggering upwards or downwards the instruction of adjusting the schedule parameter of the video. The schedule parameter of the video comprises the switch of the display picture and the switch of its corresponding audio. Since the video play application matches with the long side of the display screen when playing video, the user's corresponding holding manner is to hold the electronic apparatus in a landscape mode. At this time, when the user currently holds the electronic apparatus in landscape mode, the upwards/downwards relative movement of the two bodies of the first electronic apparatuses through the at least two connecting devices corresponds to the left and right of the user of the first electronic apparatus and at the same time corresponds to the back and forth of the play video data of the video play application, which is more convenient for the user to perform the relative operation on the two bodies of the first electronic apparatus when viewing the video. The processing efficiency and use efficiency of the first electronic apparatus are increased.

In the embodiment of the present application, the sensor is configured to detect sliding states of the first body 10 and the second body 20 and inform the processor when the sliding states of the first body 10 and the second body 20 are determined. The processor performs corresponding processing according to the sliding states of the first body 10 and the second body 20, and outputs a processing result through an output device of the first electronic apparatus such as the display screen. For example, as an implementation, the first electronic apparatus may be made to be in a first operation state such as a message opening state when the first body 10 is in the first state relative to the second body 20, while the first electronic apparatus may made to be in the first operation state such as recovering to the operation normal state of the first electronic apparatus when the first body 10 is in the second state relative to the second body 20.

In the embodiment of the present application, the M electrical elements comprise an indicating device and a display screen. The indicating device may be arranged at the upper surface of the second body 20. For example, the indicating device may be a touching area or may be an operation keyboard and so on. The display screen may be arranged inside the first accommodation space of the first body 10. The display output area of the display screen is exposed through the upper surface of the first body 10.

The upper surface of the second body 20 exposes the indicating device when the first body slides to the first limit position relative to the second body. In other words, the indicating device is exposed on the upper surface of the second body 20 when the first body is pushed to the upward sliding limit position provided by the connecting device.

In the embodiment of the present application, each of the at least two connecting devices comprises a damping device 303. A first terminal of the damping device 303 is fixedly connected to the first connector 304. A second terminal of the damping device 303 is fixedly connected to the lower surface of the second body 20.

In a process that the first body 10 slides from the first limit position to the second limit position relative to the second body 20 through the connecting device, in a process that the first body 10 slides from the first limit position to a first position relative to the second body 20, the damping device 303 provides an incremental first damping force; in a process that the first body 10 slides from the first position to the second limit position relative to the second body 20, the damping device provides a degressive first pushing force. The damping device 303 provides a maximum first damping force when the first body 10 slides from the first limit position to the first position relative to the second body 20. The damping device 303 transforms from providing the maximum first damping force into providing a maximum first pushing force when the first body 10 slides to the second limit position starting from the first position relative to the second body 20. An acting direction of the first damping force is opposite to an acting direction of the first pushing force.

In a process that the first body 10 slides from the second limit position to the first limit position relative to the second body 20 through the connecting device, in a process that the first body 10 slides from the second limit position to a first position relative to the second body 20, the damping device 303 provides an incremental second damping force; in a process that the first body 10 slides from the first position to the first limit position relative to the second body 20, the damping device 303 provides a degressive second pushing force. The damping device 303 provides a maximum second damping force when the first body 10 slides from the second limit position to the first position relative to the second body 20. The damping device 303 transforms from providing the maximum second damping force into providing a maximum second pushing force when the first body 10 slides to the first limit position starting from the first position relative to the second body 20. An acting direction of the second damping force is opposite to an acting direction of the second pushing force.

In other words, by an arrangement of the damping device 303 in the connecting device of the embodiment of the present application, under the condition without external force interference, the first body may be either in the first state or in the second state relative to the second body 20.

In the embodiment of the present application, the damping device 303 may be an elastic component having a radian. The damping device 303 provides a damping force or a pushing force by deforming its radian. When the first body 10 slides to the first position relative to the second body 20, the elastic component deforms into a maximum radian value in the process of sliding between the first limit position and the second limit position. A first connecting position point and a second connecting position have a closest distance.

The embodiment of the present application provides a method for controlling response. The method for controlling response may be applied to the first electronic apparatus described above by combining with FIGS. 1-3, and may also be applied to other electronic apparatus. The method for controlling response according to the embodiment of the present application comprises: detecting the relative movement of the first body of the electronic apparatus relative to the second body, obtaining a detection result, and controlling the electronic apparatus to perform a predetermined function based on the detection result. In the case that the first body comprises the display screen, the controlling the electronic apparatus to perform the predetermined function based on the detection result may comprise: controlling the display screen to output predetermined display content based on the detection result. Typically, the first body comprises the first input device of the electronic apparatus. For the convenience, the second body in the electronic apparatus will be referred to as a body device below. The method for controlling response according to the embodiment of the present application will be described by referring to FIG. 4. The method is applicable to a second electronic apparatus. The second electronic apparatus comprises the first input device and the body device. The first input device is flexibly connected with the body device through the connecting devices. Moreover, the first input device may be forced to generate the relative movement relative to the body device when the external force is applied to the first input device. That is, the second electronic apparatus according to the present application adopts an entity sliding/rotating arrangement to input, which is being different from operating the virtual con or key displayed on the display touch screen to input in the prior art. The details about the apparatus will be described later. For example, the second electronic apparatus herein may be a mobile phone, a tablet computer, a wearable device or the like.

Figure 4:
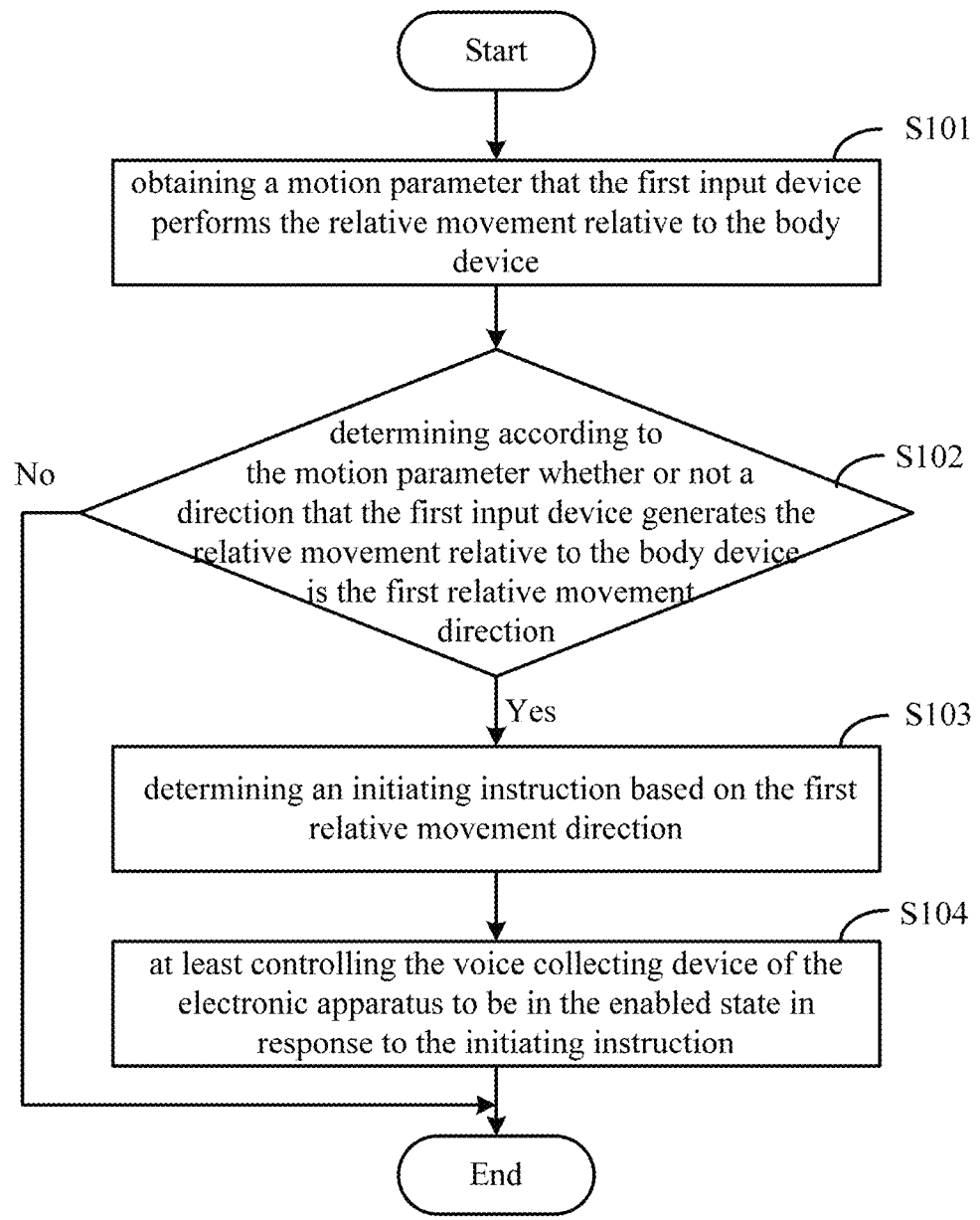
FIG. 4 shows a flow chart of a process of a method for controlling response according to an embodiment of the present application.

As shown in FIG. 4, the method comprises steps S101 to S104 below.

First, in step S101, obtaining a motion parameter that the first input device performs the relative movement relative to the body device.

For example, the motion parameter may be a contact signal of two limit positions (for example, up and down positions) on the body device relative to which the first input device may relatively move. The following will describe by taking the relative movement in upward and downward directions as an example. In particular, when the first input device slides upwards to the upper limit position, the first input device at this time contacts with the upper limit position on the body device. Similarly, when the first input device slides downwards to the lower limit position, the first input device at this time contacts with the lower limit position on the body device. The contact signal may be detected by setting a detection touch point at the limit position. However, such mode may just roughly detect directions of moving upwards or downwards.

For another example, the mode of detecting magnetic flux may be used to accurately detect the relative movement of the first input device relative to the body device, for example, a Hall element may be arranged at one or more positions of the body device and a magnetic element may be arranged on the first input device, so as to detect the relative position between the body device and the first input device.

The detection modes illustrated above are common measures in the art, and thus their details are not further described. Of course, the above detection modes described above are just for illustration. The present application does not limit thereto. Those skilled in the art should understand any other mode that may detect parameters of the relative movement may be similarly applied to the present application, and should be included into the scope of the present application.

Then, in step S102, it is determined according to the motion parameter whether or not a direction that the first input device generates the relative movement relative to the body device is a first relative movement direction. The first relative movement direction is used to represent a first input direction of an operation input formed in a way that the operation body controls the first input device to relatively move relative to the body device. For example, the user may operate the first input device to slide upwards relative to the body device, or may operate the first input device to slide downwards relative to the body device. For another example, the user may operate the first input device to slide towards the left relative to the body device, or may operate the first input device to slide towards the right relative to the body device. For another example, the user may operate the first input device to rotate clockwise relative to the body device, or may operate the first input device to rotate anticlockwise relative to the body device. That is, the relative movement generally includes two directions opposite to each other. Of course, the above relative movement manners are just for illustration. Any other relative movement manner may be similarly applied to the present application, and should be included into the scope of the present application.

If it is determined in step S102 that the relative movement direction is the first relative movement direction, then the process proceeds to step S103. Step S103 determines the initiating instruction based on the first relative movement direction. Otherwise, the process ends up.

Finally, in step S104, the voice collecting device of the second electronic apparatus is controlled to be in an enabled state in response to the initiating instruction, so as to collect voice input performed by the user of the second electronic apparatus. For example, the voice input is initiated when the first relative movement direction is downwards.

The method for controlling response according to the present application performs input operation through the relative movement of an entity instead of a touch way of a virtual icon/key, and then initiates the voice collecting device based on the relative movement direction. Thus, it is clear that such way is capable of effectively removing the problem of slow software response because the input performed by the first input device is an operation at the hardware level.

Figure 5:
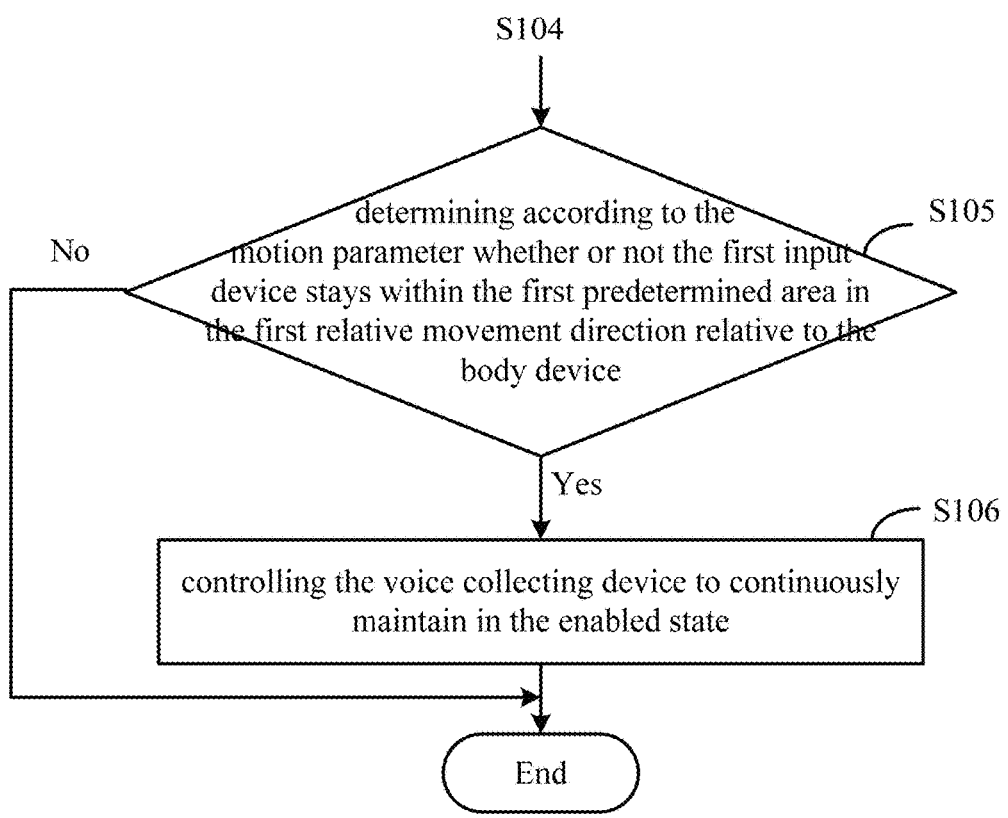
FIG. 5 shows a flow chart of a process of an example of steps subsequent to step S104 as shown in FIG. 4.

FIG. 5 shows a flow chart of a process of an example of subsequent steps after step S104 as shown in FIG. 4. As show in FIG. 5, the method further comprises step S105 and step S106.

When the voice collecting device is in the enabled state, the process proceeds to step S105. In step S105, it is determined according to the motion parameter whether or not the first input device stays within a first predetermined area in the first relative movement direction relative to the body device. Herein, the first predetermined area refers to an area with a specific size close to the limit position (including the limit position). The first input device staying within the first predetermined area represents a maintaining state of the operation input of the operation body. For example, when the user does not release his/her hand after performing pulling-down operation on the first input device to make that the first input device slides downwards to the lower limit position relative to the body device, and the position of the first input device keeps unchanged, at this time it should be deemed that the first input device stays within the first predetermined area in the first relative movement direction relative to the body device. Or, for another example, when the user does not release his/her hand after performing pulling-down operation on the first input device to make that the first input device slides downwards to the lower limit position relative to the body device, but the position of the first input device slightly changes (basically unchanged), at this time it should be also deemed that the first input device stays within the first predetermined area in the first relative movement direction relative to the body device. Thus, no matter the first input device maintains completely unchanged or slightly moves after being pulled down, only if the first input device maintains within the first predetermined area relative to the body device, it should be deemed that the first input device is maintained in the pulling-down state.

When it is determined according to the motion parameter in step S105 that the first input device stays within the first predetermined area in the first relative movement direction relative to the second electronic apparatus, the process proceeds to step S106. In step S106, the voice collecting device is controlled to continuously maintain in the enabled state, i.e., continuing to collect the voice data in the maintaining state.

The above description is the process of continuing to collect the voice when the operation body stays on the first input device to keep for example in the pulling-down state. However, when the operation body leaves the first input device, it should be deemed that the input operation ends up.

In order to detect leaving of the operation body on the first input device, as a possible implementation, the second electronic apparatus further comprises a second input device arranged on the first input device. The second input device and the first input device is a whole and moves together. The specific implementation of the second input device will be described in details in the later description of the embodiment of the second electronic apparatus.

Figure 6:
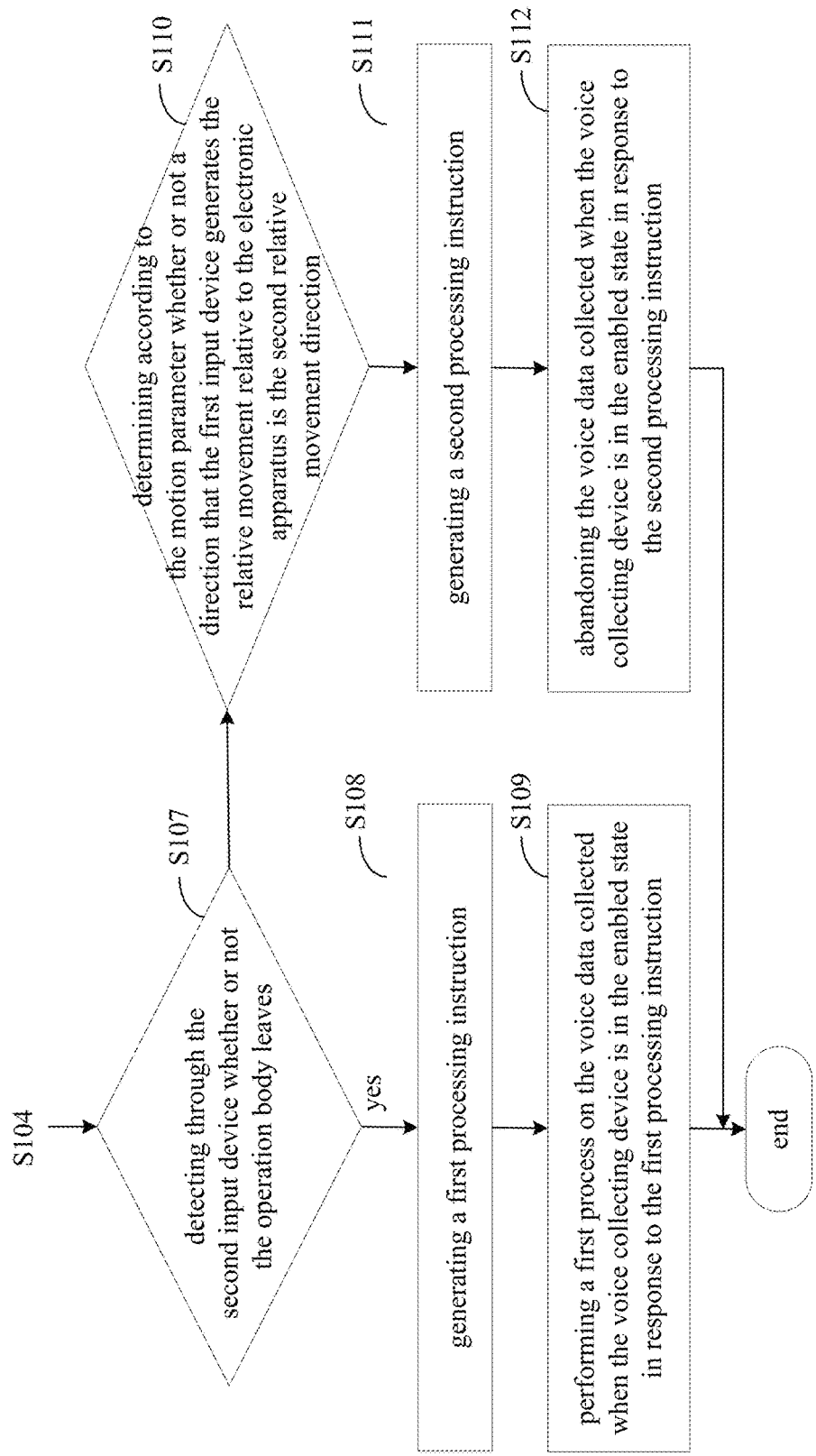
FIG. 6 shows a flow chart of a process of another example of subsequent steps after step S104 as shown in FIG. 4.

FIG. 6 shows a process of steps subsequent to step S104 as shown in FIG. 4 in this implementation.

As shown in FIG. 6, the method further comprises step S107 to step S112.

When the voice collecting device is enabled, the process proceeds to step S107. In step S107, it is detected through the second input device whether or not the operation body leaves. When it is detected in step S107 that the operation body leaves, the process proceeds to step S108. In step S108, a first processing instruction is generated. As described above, in fact, the leaving of the operation body is used to represent that the input operation of the operation body ends up. In other words, the voice collecting operation may be already completed and it is desired to perform next step. After the operation body leaves, if the connecting device is a springback device described below, then the first input device recovers to the initial position through connecting device. If the connecting device is not the springback device described below, then the first input device stays at the position when the operation body leaves. In other words, the implementation of detecting through the second input device whether or not the operation body leaves may be applied to either the springback device or a non-springback device.

After the step S108, the process proceeds to step S109. In step S109, in response to the first processing instruction, a first processing is performed on the voice data collected when the voice collecting device is in the enabled state. For example, the first process herein may be sending out the collected voice data. Or, alternatively, the first process herein may also be performing voice recognition on the collected voice data and then generating a control instruction. Of course, the above examples are just for illustration. The present application is not limited thereto. Any other possible voice data processing may be similarly applied to the present application and shall be included in the scope of the present application.

On the other hand, if it is not detected the leaving of the operation body in step S107, then the process proceeds to step S110. In step 110, it is determined according to the motion parameter whether or not the direction that the first input device generates the relative movement relative to the second electronic apparatus is a second relative movement direction. When it is determined according to the motion parameter in step S110 the direction that the first input device generates the relative movement relative to the second electronic apparatus is the second relative movement direction, the process proceeds to step S111. In step S111, a second processing instruction is generated. Next, the process proceeds to step S112. In step S112, the voice data collected when the voice collecting device is in the enabled state is abandoned in response to the second processing instruction. That is, for example, the operation of abandoning the collected voice data, i.e., the canceling operation is performed, when the operation body performs pushing-upward operation on the first input device after performing pulling-down operation (the two continuous actions occur in sequence in the case that the operation body does not leave) on the same. On the other hand, when it is determined according to the motion parameter in step S110 that the direction that the first input device generates the relative movement relative to the second electronic apparatus is not the second relative movement direction, the process comes back to step S107.

As described above, the connecting device may comprise a springback device or may not comprise a springback device. The springback device is configured to support the first input device to recover to the initial position when the operation body on the first input device leaves. That is, in the case of comprising the springback device, after the operation body leaves, the first input device for examples recovers upwards to the initial position through the springback device. For example, the initial position is generally the middle position located in the middle of the two upper and lower limit positions. However, the relative movement of recovering upwards herein cannot be deemed as the input operation performed by the user, but just deemed as an operation of recovering to the initial position. Therefore, in the case of comprising the springback device, it does not need the second input device described above to detect the leaving of the operation body, but only needs to detect whether or not the first input device leaves the first predetermined area.

Figure 7:
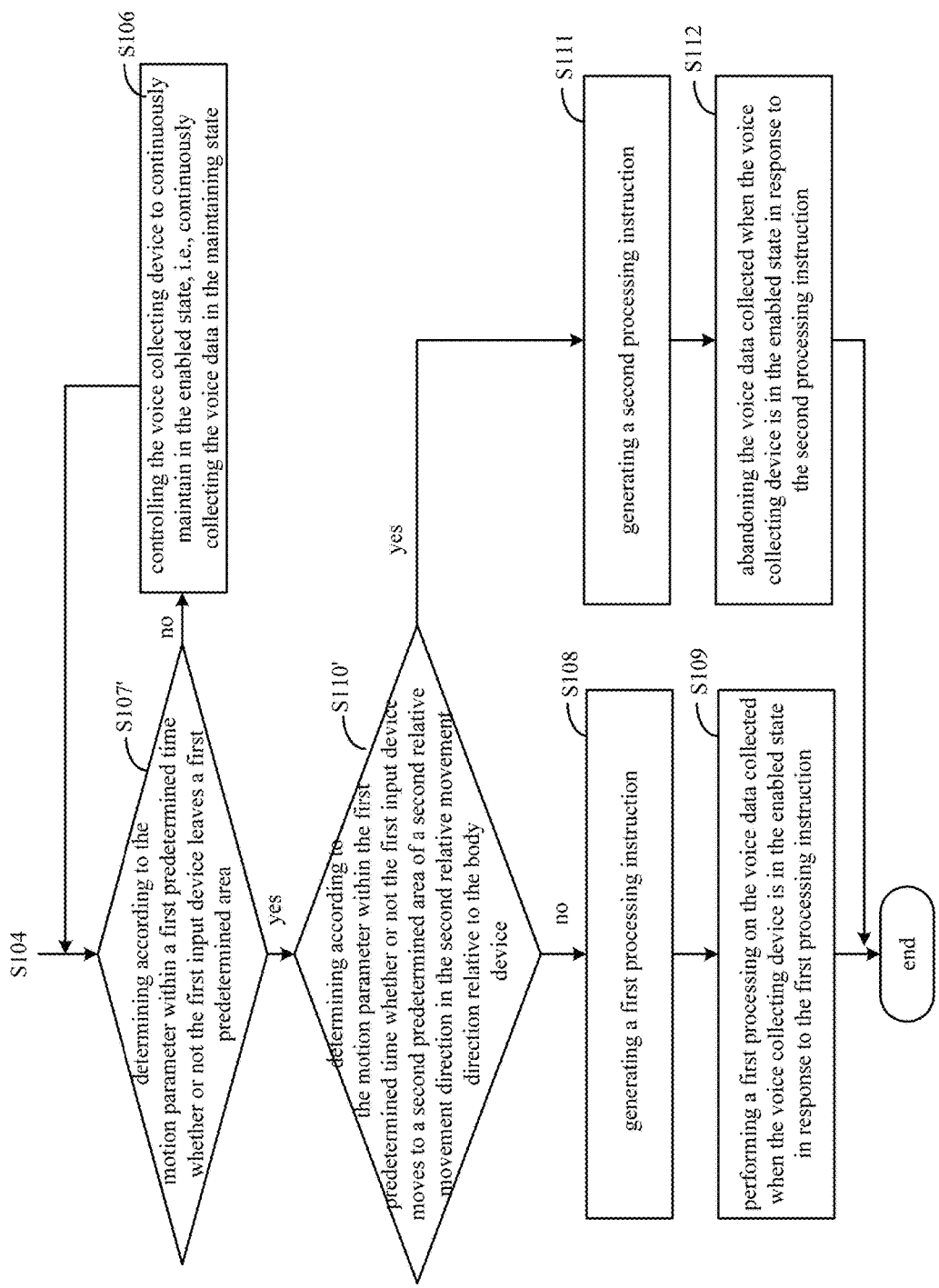
FIG. 7 shows a flow chart of a process of yet another example of steps subsequent to step S104 as shown in FIG. 4.

FIG. 7 shows steps subsequent to step S104 in FIG. 4 in this implementation.

As shown in FIG. 7, the method further comprises steps S106, S107', S110', S108, S109, S111 and S112.

When the voice collecting device is enabled, the process proceeds to step S107'. In step S107' different from step S107, it is determined according to the motion parameter within a first predetermined time whether or not the first input device leaves the first predetermined area. Herein, it needs to accurately detect the relative movement of the first input device relative to the body device. For example, the relative movement of the first input device relative to the body device may be accurately detected by means of detecting the change of the magnetic flux as described above. If it is determined in step S107' that the first input device leaves the first predetermined area, then the process proceeds to step S110'. In step S110', it is determined according to the motion parameter during the first predetermined time whether or not the first input device moves to the second predetermined area in the second relative movement direction relative to the body device in the second relative movement direction opposite to the first relative movement direction. If it is determined according to the motion parameter during the first predetermined time in step S110' that the first input device does not move to the second predetermined area in the second relative movement direction relative to the body device in the second relative movement direction opposite to the first relative movement direction, then the process proceeds to step S108. Step S108 is the same as that described above. In step S108, the first processing instruction is generated to represent that the first input device leaves the first predetermined area and recovers to the initial position through the springback device.

The subsequent step S109 is the same as that described above, i.e., the first process is performed on the voice data collected when the voice collecting device is in the enabled state, in response to the first processing instruction.

It represents that the input operation of the operation body ends up when the first input device leaves the first predetermined area and recovers to the initial position through the springback device.

On the other hand, if it is determined according to the motion parameter during the first predetermined time in step S110' that the first input device moves to the second predetermined area in the second relative movement direction relative to the body device, in the second relative movement direction opposite to the first relative movement direction, then the process proceeds to step S111. Step S111 is the same as that described above. In step S111, the second processing instruction is generated to represent that the first input device leaves the first predetermined area and the second input device moves to the second predetermined area. That is to say, for example, the operation of abandoning the collected voice data, i.e., the canceling operation is performed, when the operation body performs pushing-upwards operation on the first input device (to the upper limit position or close to the upper limit position) after performing pulling-down operation (to the lower limit position or close to the lower limit position), instead of just recovering the first input device to the original position.

The subsequent step S112 is the same as that described above, i.e., abandoning the voice data collected when the voice collecting device is in the enabled state in response to the second processing instruction.

In addition, it needs to indicate that the second electronic apparatus may comprise a first state and a second state. The first state is a normal operation state of the second electronic apparatus, and the second state is a low power consumption state of the second electronic apparatus. The display screen of the second electronic apparatus is at least to be controlled in a turn-off state when the second electronic apparatus is in the second state.

The respective steps of the method described above may be performed when the second electronic apparatus is in the second state, i.e., being performed when the screen is in the turn-off state. In particular, when the second electronic apparatus is in the second state, the user may initiate the voice collecting device by operating the first input device to collect the voice input by the user. At this time, the second electronic apparatus is all the time in the second state.

Of course, as another embodiment, when the second electronic apparatus is in the second state, after the user inputs the voice, it may further make the second electronic apparatus vibrate or emit a prompt voice to confirm with the user that the voice input has been collected. Or, when the second electronic apparatus is in the second state, after the user operates the first input device to initiate the voice collecting device, the second electronic apparatus is awakened, i.e., switching from the second state to the first state.

Of course, the respective steps of the method described above may also be performed in the case that the second electronic apparatus currently runs any application and that the second electronic apparatus is in the first state.

In the above description, the process of the method for controlling response according to the respective embodiments of the present application is described in detail by referring to FIGS. 4-7. Next, configuration of the second electronic apparatus according to respective embodiments of the present application will be described in detail by referring to FIG. 8.

Figure 8:
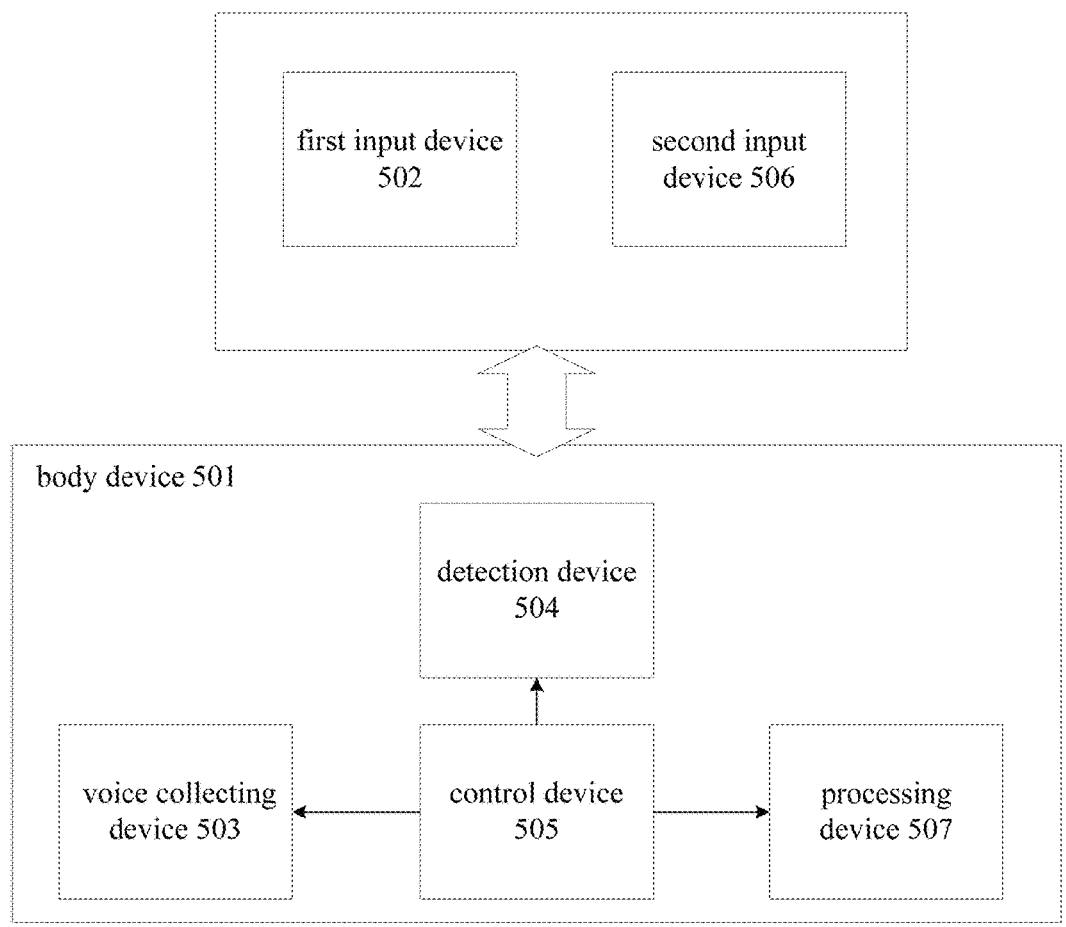
FIG. 8 shows a functional block diagram of a configuration of a second electronic apparatus according to an embodiment of the present application.

First, FIG. 8 shows a functional block diagram of a configuration of the second electronic apparatus according to an embodiment of the present application. As shown in FIG. 8, a second electronic apparatus 500 comprises: a body device 501, a first input device 502, a voice collecting device 503, a detection device 504 and a control device 505.

The first input device 502 is flexibly connected with the body device 501 through the connecting device. Moreover, it may force the first input device to generate the relative movement relative to the body device when the external force is applied to the first input device.

For example, the connecting device may be a springback device being capable of automatically recovering to the original position. In particular, when the external force is applied to the first input device through the operation body, the first input device may relatively move relative to the body device through specific mechanical structure, and may recover to the original position after the external force disappears. In general, the original position of the first input device is the middle position between the two limit positions.

Of course, the connecting device may also be a non-springback device being not capable of automatically recovering to the original position.

The voice collecting device 503 is located in the body device 501 and configured to collect the voice input.

The detection device 504 is located in the body device 501 and configured to obtain the motion parameter that the first input device 502 performs the relative movement relative to the body device 501 and determine the first relative movement direction that the first input device 502 generates the relative movement relative to the body device 501 according to the motion parameter. The first relative movement direction is used to represent the first input direction of the operation input formed in a way that the operation body controls the first input device 502 to relatively move relative to the body device 501.

Corresponding to the content described above, the detection device 504 may be a detection touch point disposed at the limit position, or may be a plurality of Hall elements arranged on the body device.

The control device 505 is located inside the body device 501 and configured to determine an initiating instruction based on the first relative movement direction, and at least control the voice collecting device 503 to be in the enabled state in response to the initiating instruction, so as to collect the voice input performed by the user of the second electronic apparatus. For example, the voice input is initiated when the first relative movement direction is downwards.

The second electronic apparatus according to the present application performs input operation through a relative movement of an entity instead of a touch way of a virtual icon/key, and then initiates the voice collecting device based on the relative movement direction. Thus, it is clear that such way is capable of effectively removing the problem of slow software response because the input performed by the first input device is an operation at the hardware level.

Next, the structural configuration of the second electronic apparatus according to the embodiment of the present application by referring to FIGS. 9A-9C, 10 and 11.

Figure 9A:
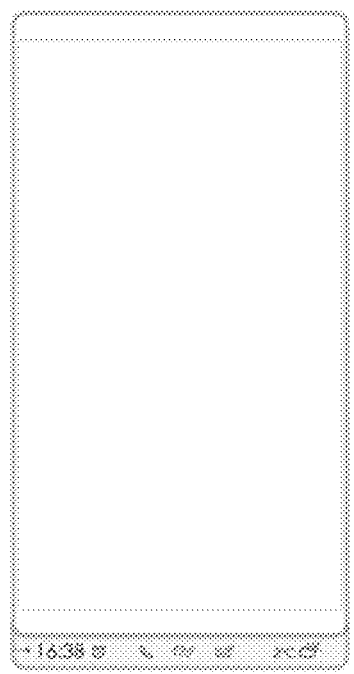
FIGS. 9A-9C show a view of appearance of a second electronic apparatus according to an embodiment of the present application.
Figure 9B:
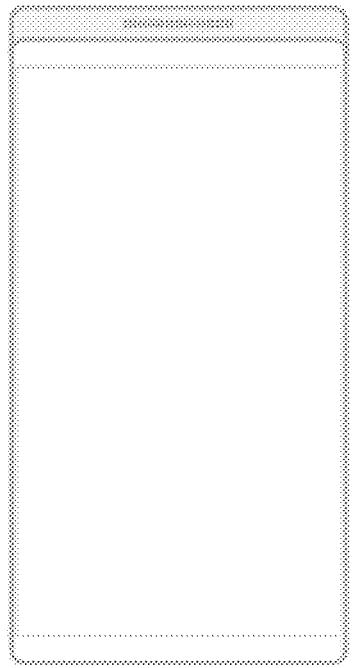
Figure 9C:

First, FIGS. 9A-9C show a view of appearance of an example of the second electronic apparatus according to an embodiment of the present application. As shown in FIGS. 9A-9C, the second electronic apparatus 500 comprises a display touch screen. Moreover, the display touch screen is fixed on the first input device, so that the display touch screen is flexibly connected with the body device through the connecting devices. FIG. 9A is a front view when the first input device slides upwards to the upper limit position. FIG. 9B is a front view when the first input device slides downwards to the lower limit position. FIG. 9C is a side view when the first input device slides upwards to the upper limit position.

Figure 10:
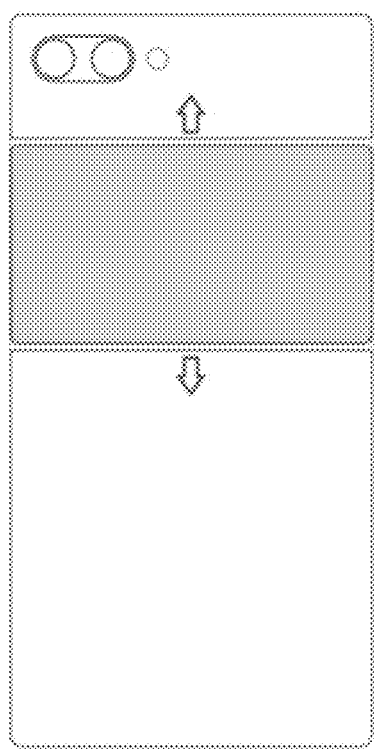
FIG. 10 shows a view of appearance of a second electronic apparatus according to another embodiment of the present application.

FIG. 10 shows a view of appearance of the second electronic apparatus of another example according to the embodiment of the present application. In this example, the second electronic apparatus 500 also comprises the display touch screen. The display touch screen is arranged inside the body device of the second electronic apparatus. The display area of the display touch screen is exposed through the first surface of the body device. Being different from the example as shown in FIGS. 9A-9C, the first input device is a tablet. The tablet is flexibly connected to the second surface of the body device through the connecting devices. The first surface is opposite to the second surface. That is, the first input device is a tablet that is located at the back of the second electronic apparatus and may slide upwards and downwards relative to the body device. Therefore, FIG. 10 only shows a back view of appearance of the second electronic apparatus.

Figure 11:
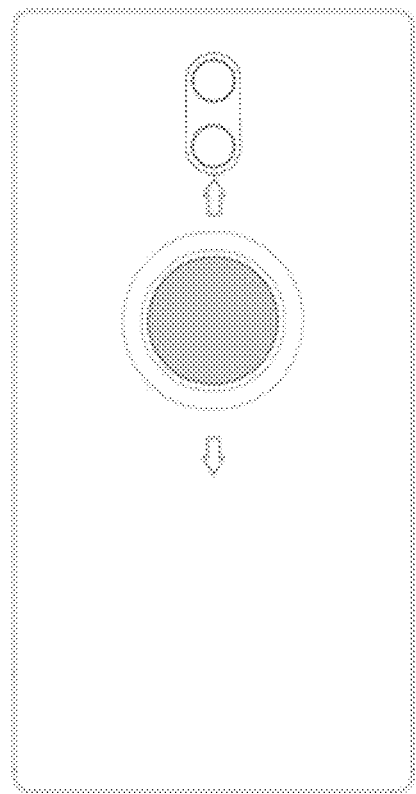
FIG. 11 shows a view of appearance of a second electronic apparatus according to yet another embodiment of the present application.

FIG. 11 shows a view of appearance of another example of the second electronic apparatus according to the embodiment of the present application. FIG. 11 differs from FIG. 10 in that the tablet may also be a circle. FIG. 11 only shows sliding upwards and downwards in the case that the tablet is the circle. However, it may be conceivable of rotating clockwise/anticlockwise.

In addition, by referring to FIG. 8 again, the second electronic apparatus 500 according to the embodiment of the present application further comprises a second input device 506 arranged on the first input device. The second input device and the first input device are a whole and move together. In the embodiments as shown in FIGS. 9A-9C, the display touch screen is the second input device 506. Leaving of the operation body may be detected through the display touch screen. In the embodiments as shown in FIGS. 10 and 11, on the tablet may be arranged a sensing device such as a pressure sensor which is used as the second input device to detect the leaving of the operation body. Or, on the tablet may also be integrated a touch pad in order to accurately detect the movement track of the operation on the tablet except sensing the leaving of the operation body.

When the voice collecting device 503 is in the enabled state, the detection device 504 determines according to the motion parameter whether or not the first input device 502 stays within the first predetermined area in the first relative movement direction relative to the body device 501. It represents the maintaining state of the operation input of operation body when the first input device 502 stays within the first predetermined area.

When it is determined according to the motion parameter that the first input device 502 maintains within the first predetermined area in the first relative movement direction relative to the body device 501, the control device 505 controls the voice collecting device 503 to continuously maintain in the enabled state.

After the voice collecting device 503 is enabled, the control device 505 generates the first processing instruction when the leaving of the operation body is detected through the second input device 506. The leaving of the operation body is used to represent that the input operation of the operation body ends up.

The second electronic apparatus 500 further comprises a processing device 507 configured to perform the first processing on the voice data collected when voice collecting device is in the enabled state in response to the first processing instruction. For example, the first processing herein may be sending out the collected voice data. Or, alternatively, the first processing herein may also be performing voice recognition on the collected voice data and then generating the control instruction.

As an implementation, it may detect through the second input device whether or not the operation body exists. In particular, it may determine through the second input device 506 that the operation body exists when the voice collecting device 503 is in the enabled state.

The second relative movement direction that the first input device 502 generates the relative movement relative to the body device 501 is determined according to the motion parameter, when the voice collecting device 503 is in the enabled state.

In the case that the operation body exists, when the first input device 502 performs the relative movement in the second relative movement direction relative to the body device 501, the control device 505 generates the second processing instruction.

The processing device 507 abandons the voice data collected when the voice collecting device is in the enabled state in response to the second processing instruction.

As described above, the connecting device further comprises the springback device configured to support the first input device to recover to the initial position when the operation body on the first input device leaves.

In the case of comprising the springback device, as another possible implementation, it may detect whether or not the operation body exists without the second input device 506.

In particular, when the voice collecting device 503 is in the enabled state, the detection device 504 determines according to the motion parameter during the first predetermined time that the first input device 502 leaves the first predetermined area and determines that the first input device 502 does not move to the second predetermined area in the second relative movement direction relative to the body device in the second relative movement direction opposite to the first relative movement direction, the control device 505 generates the first processing instruction to represent that the first input device 502 leaves the first predetermined area and rebounds to the initial position through the springback device.

The processing device 507 performs the first processing on the voice data collected when the voice collecting device 503 is in the enabled state in response to the first processing instruction.

When the first input device 502 leaves the first predetermined area and recovers to the initial position through the springback device, it represents that the input operation of the operation body ends up.

When the voice collecting device 503 is in the enabled state, the detection device 504 determines according to the motion parameter during the first predetermined time that the first input device 502 leaves the first predetermined area and determines that the first input device 502 moves to the second predetermined area in the second relative movement direction relative to the body device, in the second relative movement direction opposite to the first relative movement direction, the control device 505 generates the second processing instruction to represent that the first input device 502 leaves the first predetermined area and moves the second predetermined area.

The processing device 507 abandons the voice data collected when the voice collecting device 503 is in the enabled state in response to the second processing instruction.

Furthermore, as described above, the second electronic apparatus comprises a first state and a second state. The first state is a normal operation state of the second electronic apparatus, and the second state is a low power consumption state of the second electronic apparatus. The display screen of the second electronic apparatus is at least controlled to be in a turn-off state when the second electronic apparatus is in the second state. The processes performed by the above respective devices may be performed when the second electronic apparatus is in the second state.

In particular, when the second electronic apparatus is in the second state, the user may initiate the voice collecting device by operating the first input device to collect the voice input by the user. At this time, the second electronic apparatus is all the time in the second state.

Of course, as another embodiment, when the second electronic apparatus is in the second state, after the user inputs the voice, it may further make the second electronic apparatus vibrate or emit a prompt voice to confirm with the user that the voice input has been collected. Or, when the second electronic apparatus is in the second state, after the user operates the first input device to initiate the voice collecting device, the second electronic apparatus is awakened, i.e., switching from the second state to the first state.

Of course, the processes performed by the respective devices described above may also be performed in the case that the second electronic apparatus currently runs any application and that the second electronic apparatus is in the first state.

Since the second electronic apparatus according to the respective embodiments of the present application is completely corresponding to the method for controlling response described above, its details are not further described for brevity.

The method for controlling response and the second electronic apparatus according to the embodiments of the present application are already described in detail by referring to FIGS. 4-11. The method for controlling response and the second electronic apparatus according to the embodiments of the present application perform input operation through a relative movement of an entity instead of a touch way of a virtual icon/key, and then initiate the voice collecting device based on the relative movement direction. Thus, it is clear that such way is capable of effectively removing the problem of slow software response because the input performed by the first input device is an operation at the hardware level.

It is noted that the terms "include", "comprise" or any other variant in the present specification intend to cover non-exclusive containing, so that processes, methods, objects or devices comprising a series of elements not only comprise those elements but also comprise other elements not explicitly listed, or further comprise other elements inherent in the process, methods, objects or devices. In the case of no further limitation, the element defined by an expression of "comprising . . . " does not exclude that there are additional same elements in the processes, methods, objects or devices comprising the elements.

Finally, it is noted that the series of processes described above not only comprise the processes performed in a time sequence described herein, but also comprise the processes performed in parallel or respectively but not performed in a time sequence.

The respective embodiments provided in the present application are just for illustration. The technical solutions disclosed in the embodiments of the present application may be randomly combined in the case of not conflicting with each other. Typically, one or more technical features of the second electronic apparatus may be added to the first electronic apparatus.

As a first example of a combination, on the basis of the first embodiment of the first electronic apparatus described with respect to FIGS. 1-3, the technical features of the second electronic apparatus described with respect to FIGS. 8-11 may be combined. Typically, a third electronic apparatus according to the embodiment of the present application may comprise: a first body; a second body arranged on the first body in a superimposed manner and being capable of performing a relative movement relative to the first body; a detection device configured to detect the relative movement performed by the first body relative to the second body and obtain a detection result; a control device configured to control the electronic apparatus to perform a predetermined function based on the detection result. The first body may comprise a display screen. The control device controls the display screen to output the predetermined display content when the detection result obtained by the detection device indicates that the second body performs sliding operation relative to the first body.

The third electronic apparatus may further comprise: at least two connecting devices and M electrical elements. The first body may be used as a first input device of the third electronic apparatus. The first input device is capable of producing the relative movement relative to the body device when being applied an external force.

The third electronic apparatus may further comprise a voice collecting device configured to collect voice. The detection device may be located in the second body, and configured to obtain a motion parameter that the first input device performs a relative movement relative to the second body and determine a first relative movement direction that the first input device generates the relative movement relative to the second body according to the motion parameter. The first relative movement direction is used to represent a first input direction of an operation input formed in a way that the first input device relatively moves relative to the body device under a control of an operation body. The control device may be located inside the second body, and configured to determine an initiating instruction based on the first relative movement direction and at least control the voice collecting device to be in an enabled state in response to the initiating instruction, so as to collect voice input performed by the user of the electronic apparatus.

When the voice collecting device is in the enabled state, the detection device may determine according to the motion parameter whether or not the first input device stays within the first predetermined area in the first relative movement direction relative to the body device. The first input device staying within the first predetermined area represents the maintaining state of the operation input of operation body. When it is determined according to the motion parameter that the first input device maintains within the first predetermined area in the first relative movement direction relative to the body device, the control device controls the voice collecting device to continuously maintain in the enabled state.

The third electronic apparatus further comprises a second input device and a processing device. The second input device is located in the first body. The second input device and the first input device are a whole and move together. In the case that the voice collecting device is enabled and the second input device detects the leaving of the operation body, the control device generates the first processing instruction. The leaving of the operation body is used to represent that the input operation of the operation body ends up. The processing device is configured to perform the first processing on the voice data collected when voice collecting device is in the enabled state in response to the first processing instruction. In the case that the voice collecting device is enabled and the second input device determines that the first input device exists, if the detection device determines according to the motion parameter that first input device performs the relative movement in the second relative movement relative to the body device, then the control device generates a second processing instruction. The processing device abandons the voice data collected when the voice collecting device is in the enabled state in response to the second processing instruction.

When the voice collecting device is in the enabled state, it may determine through the second input device that the operation body exists. When the voice collecting device is in the enabled state, the second relative movement direction that the first input device generates the relative movement relative to the body device is determined according to the motion parameter. In the case that the operation body exists, when the first input device performs the relative movement in the second relative movement direction relative to the electronic apparatus, the control device generates the second processing instruction. The processing device abandons the voice data collected when the voice collecting device is in the enabled state in response to the second processing instruction.

The connecting device may further comprise the springback device configured to support the first input device to rebound to the initial position when the operation body on the first input device leaves. When the voice collecting device is in the enabled state, the detection device determines according to the motion parameter during the first predetermined time that the first input device leaves the first predetermined area and determines that the first input device does not move to the second predetermined area in the second relative movement direction relative to the body device in the second relative movement direction opposite to the first relative movement direction, and the control device generates the first processing instruction. The processing device performs the first processing on the voice data collected when the voice collecting device is in the enabled state in response to the first processing instruction. When the first input device leaves the first predetermined area and rebounds to the initial position through the springback device, it represents that the input operation of the operation body ends up.

When the voice collecting device is in the enabled state, the detection device determines according to the motion parameter during the first predetermined time that the first input device leaves the first predetermined area and determines that the first input device moves to the second predetermined area in the second relative movement direction relative to the body device in the second relative movement direction opposite to the first relative movement direction, the control device generates a second processing instruction. The processing device, in response to the second processing instruction, abandons the voice data collected when the voice collecting device is in the enabled state.

The second electronic apparatus may comprise a first state and a second state. The first state is a normal operation state of the electronic apparatus, and the second state is a low power consumption state of the electronic apparatus. The display screen of the second electronic apparatus is at least controlled to be in a turn-off state when the second electronic apparatus is in the second state.

The processes performed by the respective devices in the third electronic apparatus described above are performed when the electronic apparatus is in the second state, or performed in the case that the electronic apparatus currently runs any application and that the electronic apparatus is in the first state.

In addition, the electronic apparatus to which the method for controlling response according to the embodiment of the present application is applied may be the first electronic apparatus described by combining with FIGS. 1-3, or may be the second electronic apparatus described by combining with FIGS. 8-11, or may be other electronic apparatuses that combine with the features in the first electronic apparatus and the second electronic apparatus, for example, the third electronic apparatus described above. The method for controlling response according to the embodiment of the present application detects the relative movement of the first body of the electronic apparatus relative to the second body thereof, obtains a detection result, and controls the electronic apparatus to perform a predetermined function based on the detection result.

In the case that the first body comprises the display screen, the controlling the electronic apparatus to perform the predetermined function based on the detection result may comprise: controlling the display screen to output the predetermined display content based on the detection result.

In the case that the first body comprises the first input device of the electronic apparatus, the detecting the relative movement of the first body relative to the second body may include: obtaining a motion parameter that the first input device performs the relative movement relative to the second body; determining a first relative movement direction that the first input device generates the relative movement relative to the second body according to the motion parameter. The first relative movement direction is used to represent a first input direction of the operation input formed in a way that the first input device relatively moves relative to the second body under the control of the operation body. The controlling the electronic apparatus to perform the predetermined function may include: determining an initiating instruction based on the first relative movement direction; at least controlling the voice collecting device of the electronic apparatus to be in the enabled state in response to the initiating instruction, so as to collect the voice input performed by the user of the electronic apparatus.

In the several embodiments provided in the present application, it should be understood that the method and smart apparatuses disclosed may be implemented in other ways. The device embodiments described above are just for illustration. For example, a division of the units is just a division of logic functions. There may be other ways of division in the actual implementation. For example, a plurality of units or component may be combined, or may be integrated into another system, or some features may be omitted or not performed. In addition, coupling or direct coupling or communication connecting between the respective components displayed or discussed may be indirect coupling or communication connecting of devices or units through some interfaces, which may be electrical, mechanical or other forms The units described as separable components may be or may not be physically separated. The components displayed as units may be or may not be physical units, that is, they may be located at a place, or may be distributed over a plurality of network units. Part or all of the units may be selected according to the actual requirements to realize the purpose of the solutions of the embodiments.

In addition, the respective functional units in the embodiments of the present application may all be integrated into a processing unit, or may be that each unit is independently taken as a unit, or may be that two or more units are integrated into a unit. The unit integrated above may either be implemented in a form of hardware or be implemented in a form of hardware together with a software functional unit.

Finally, it is noted that the series of processes described above not only comprise the processes performed in a time sequence described herein, but also comprise the processes performed in parallel or respectively but not performed in a time sequence.

According to the description of the above implementation, it is clear for those skilled in the art to know that the present application may be implemented by means of software together with a necessary hardware platform, and of course may also be implemented all by means of software. Based on such understanding, all or part of the technical solutions of the present application that make distribution to the background art may be reflected in a form of a software product. This computer software product may be stored in a storage medium, such as ROM/RAM, a magnetic disk, an optical disk or the like, to comprise several instructions, so that a computer apparatus (it may be a personal computer, a server, or a network device or the like) performs the methods described in the respective embodiments or in some parts of the embodiments of the present application.

The above are described in details the embodiment of the present application, however, the scope sought for protection by the present application is not limited thereto. Any modification or replacement within the technical scope disclosed in the present application easily conceived by those skilled in the art who are familiar with the technical field should be considered as falling into the protection scope of the present application. Therefore, the scope sought for protection in the present application should be included into the scope sought for protection by claims.

The invention claimed is:

1. An electronic apparatus, comprising:
   a first body;
   a second body arranged on the first body in a superimposed manner and being capable of performing a relative movement relative to the first body;
   a detector that detects the relative movement of the first body relative to the second body and obtain a detection result; and
   a controller that controls the electronic apparatus to perform a predetermined function based on the detection result;
   at least two connecting devices located between the first body and the second body being a first connecting device and a second connecting device respectively, wherein each of the at least two connecting devices include a damping device, having first terminal fixedly connected to the first connecting device, and second terminal fixedly connected to the lower surface of the second body.

2. The electronic apparatus according to claim 1, wherein the first body comprises a display screen, and the controller controls the display screen to output a predetermined display content if the detection result obtained by the detection device indicates that the second body performs sliding operation relative to the first body.

3. The electronic apparatus according to claim 1, furthering comprising:
   at least two connecting devices located between the first body and the second body and being a first connecting device and a second connecting device respectively, which are symmetrically arranged and have a same structure, a sliding distance provided by the first connecting device being the same as a siding distance provided by the second connecting device;
   the first body being connected with the second body in a slidable manner through the at least two connecting devices and being capable of sliding to a first state or a second state relative to the second body through the at least two connecting devices;
   wherein the first state is a first limit position of the sliding distance provided by the at least two connecting devices that the first body slides relative to the second body, and the second state is a second limit position of the sliding distance provided by the at least two connecting devices that the first body slides relative to the second body.

4. The electronic apparatus according to claim 3, wherein
   a distance value of the sliding distance provided by the at least two connecting devices is less than a length value of a first edge of the first body arranged corresponding to the at least two connecting devices; or
   the distance value of the sliding distance provided by the at least two connecting devices is less than a length value of a first edge of the second body arranged corresponding to the at least two connecting devices,
   an upper surface of the second body being an upper surface formed by extending the sliding distance along the first edge starting from a second edge on which the at least two connecting devices are not arranged.

5. The electronic apparatus according to claim 4, wherein
   a lower surface of the second body has a first shape and extends upwards to form a side wall of the second body, and the lower surface of the second body, the side wall of the second body and the upper surface of the second body constitute a first accommodating space;
   a first connector of the first connecting device is fixed on a first side wall to form a slideway;
   a lower surface of the first body has a second shape and extends upwards to form a side wall of the first body, the lower surface of the first body and the side wall of the first body constitute a second accommodating space, and a position of the lower surface of the first body that corresponds to the connecting devices extends downwards to form a bulge which is accommodated inside the slideway; and
   a length of the first connector is the sliding distance provided by the first connecting device.

6. The electronic apparatus according to claim 4, wherein the electronic apparatus further comprises M electrical elements disposed inside the first accommodating space and the second accommodating space respectively, wherein the M electrical elements comprise:
   a sensor that obtains relative movements of the first body and the second body; and
   a processor that determines a corresponding response instruction according to the obtained relative movements of the first body and the second body.

7. The electronic apparatus according to claim 6, wherein the M electrical elements comprise:
   an indicating device arranged on the upper surface of the second body; and
   a display screen arranged inside the first accommodating space of the first body, a display output area of the display screen being exposed through the upper surface of the first body;
   wherein, the indicating device is exposed on the upper surface of the second body in a case that the first body slides to the first limit position relative to the second body.

8. The electronic apparatus according to claim 4, wherein each of the at least two connecting devices comprise:
   a damping device, having first terminal fixedly connected to the first connector, and second terminal fixedly connected to the lower surface of the second body;
   in a process that the first body slides from the first limit position to the second limit position relative to the second body through the connecting devices, or in a process that the first body slides from the first limit position to a first position relative to the second body, the damping device provides an incremental first damping force; or in a process that the first body slides from the first position to the second limit position relative to the second body, the damping device provides a degressive first pushing force; wherein the damping device provides a maximum first damping force in a case that the first body slides from the first limit position to the first position relative to the second body, and the damping device transforms from providing the maximum first damping force into providing a maximum first pushing force in a case that the first body slides to the second limit position starting from the first position relative to the second body, an acting direction of the first damping force being opposite to an acting direction of the first pushing force; and in a process that the first body slides from the second limit position to the first limit position relative to the second body through the connecting devices, or in a process that the first body slides from the second limit position to the first position relative to the second body, the damping device provides an incremental second damping force; in a process that the first body slides from the first position to the first limit position relative to the second body, the damping device provides a degressive second pushing force; the damping device provides a maximum second damping force in a case that the first body slides from the second limit position to the first position relative to the second body, and the damping device transforms from providing the maximum second damping force into providing a maximum second pushing force in a case that the first body slides to the first limit position starting from the first position relative to the second body, an acting direction of the second damping force being opposite to an acting direction of the second pushing force.

9. The electronic apparatus according to claim 8, wherein the damping device is an elastic component having a radian, the damping device provides a damping force or a pushing force by deforming its radian, the elastic component deforms into a maximum radian value in the process of sliding from the first limit position to the second limit position in a case that the first body slides to the first position relative to the second body; and a first connecting position point and a second connecting position have a closest distance.

10. The electronic apparatus according to claim 1, wherein the first body is used as a first input device of the electronic apparatus which is capable of generating the relative movement relative to the body device if it is applied an external force, and the electronic apparatus further comprises a voice collector to collect a voice input, the detector being located in the second body, and configured to obtain a motion parameter that the first input device performs the relative movement relative to the second body and determine a first relative movement direction that the first input device generates the relative movement relative to the second body according to the motion parameter, the first relative movement direction being used to represent a first input direction of an operation input formed in a way that the first input device moves relative to the second body under a control of an operation body;

the controller being located in the second body, and configured to determine an initiating instruction based on the first relative movement direction and at least control the voice collector to be in an enabled state in response to the initiating instruction, so as to collect the voice input performed by a user of the electronic apparatus.

11. The electronic apparatus according to claim 10, further comprising a second input device and a processor, wherein the second input device is located in the first body, and the second input device and the first input device are a whole and move together;

in the case that the voice collector is enabled and the second input device detects leaving of the operation body, the controller generates a first processing instruction, the leaving of the operation body being used to represent that the input operation of the operation body ends up, and the processor is configured to perform a first processing on the voice data collected during the enabled state of the voice collector in response to the first processing instruction;

in the case that the voice collector is enabled and the second input device determines that the first input device exists, if the detector determines according to the motion parameter that first input device performs the relative movement in the second relative movement direction relative to the body device, then the controller generates a second processing instruction, and the processor abandons the voice data collected during the enabled state of the voice collector in response to the second processing instruction.

12. The method according to claim 11, wherein the first body comprises a first input device of the electronic apparatus, and the detecting the relative movement performed by the first body of the electronic apparatus relative to the second body comprises:

obtaining a motion parameter that the first input device performs the relative movement relative to the second body; and determining a first relative movement direction that the first input device generates the relative movement relative to the second body according to the motion parameter, the first relative movement direction being used to represent a first input direction of an operation input formed in a way that the first input device relatively moves relative to the second body under a control of an operation body, and the controlling the electronic apparatus to perform the predetermined function based on the detection result comprises:

determining an initiating instruction based on the first relative movement direction; and at least controlling the voice collector to be in an enabled state in response to the initiating instruction, so as to collect a voice input performed by a user of the electronic apparatus.

13. The method according to claim 12, further comprising:

determining according to the motion parameter whether or not the first input device stays within a first predetermined area in the first relative movement direction relative to the second body during the enabled state of the voice collector, the first input device staying within the first predetermined area being for representing a maintaining state of the operation input of the operation body; and, controlling the voice collector to continuously stay in the enabled state if it is determined according to the motion parameter that the first input device stays within the first predetermined area in the first relative movement direction relative to the electronic apparatus.

14. The method according to claim 13, wherein the electronic apparatus further comprises a second input device arranged on the first input device, the second input device and the first input device being a whole and moving together, the method further comprising:
  generating a first processing instruction in a case that leaving of the operation body is detected through the second input device after the voice collector is enabled, the leaving of the operation body being used to represent that the input operation of the operation body ends up; and
  performing a first processing on voice data collected during the enabled state of the voice collector in response to the first processing instruction.

15. The method according to claim 14, further comprising:
  determining by the second input device that the operation body exists during the enabled state of the voice collector;
  determining a second relative movement direction that the first input device generates the relative movement relative to the electronic apparatus according to the motion parameter, during the enabled state of the voice collector;
  generating a second processing instruction if the first input device performs the relative movement in the second relative movement direction relative to the electronic apparatus in the case that the operation body exists; and
  abandoning the voice data collected during the enabled state of the voice collector in response to the second processing instruction.

16. The method according to claim 13, wherein the connecting device further comprises a springback to support the first input device to recover to an initial position in a case that the operation body on the first input device leaves, the method comprising:
  during the enabled state of the voice collector, determining according to the motion parameter during the predetermined first time that the first input device leaves the first predetermined area and that the first input device does not move to a second predetermined area in the second relative movement direction relative to the second body in the second relative movement direction opposite to the first relative movement direction, and generating the first processing instruction;
  performing a first processing on the voice data collected during the enabled state of the voice collector in response to the first processing instruction;
  wherein, in a case that the first input device leaves the first predetermined area and recovers to the initial position through the springback, it represents that the input operation of the operation body ends up.

17. The method according to claim 16, further comprising:
  during the enabled state of the voice collector, determining according to the motion parameter during the predetermined first time that the first input device leaves the first predetermined area and that the first input device moves to a second predetermined area in the second relative movement direction relative to the second body in the second relative movement direction opposite to the first relative movement direction, generating a second processing instruction, so as to represent that the first input device leaves the first predetermined area and the second input device moves to the second predetermined area; and
  abandoning the voice data collected during the enabled state of the voice collector in response to the second processing instruction.

18. The method according to claim 10, wherein the electronic apparatus comprises a first state and a second state, wherein the first state is a normal operation state of the electronic apparatus, and the second state is a low power consumption state of the electronic apparatus, a display screen of the electronic apparatus is at least controlled to be in a turn-off state in a case that the electronic apparatus is in the second state; and
  wherein respective steps of the method are performed in the case that the electronic apparatus is in the second state or performed in the case that the electronic apparatus currently runs any application and that the electronic apparatus is in the first state.

19. A method for controlling response, comprising:
  detecting a relative movement performed by a first body of an electronic apparatus relative to a second body of the electronic apparatus and obtaining a detection result; and
  controlling the electronic apparatus to perform a predetermined function based on the detection result, wherein
  the electronic apparatus comprises at least two connecting devices located between the first body and the second body being a first connecting device and a second connecting device respectively, and each of the at least two connecting devices include a damping device, having first terminal fixedly connected to the first connecting device, and second terminal fixedly connected to the lower surface of the second body.

20. The method according to claim 19, wherein the first body comprises a display screen, and the controlling the electronic apparatus to perform the predetermined function based on the detection result comprises: controlling the display screen to output a predetermined display content based on the detection result.

21. An electronic apparatus, comprising:
  a body device;
  a first input device flexibly connected with the body device through a connecting device and being capable of forcing the first input device to generate a relative movement relative to the body device in the case that an external force is applied to the first input device;
  a voice collector to collect voice;
  a detector located in the body device, and configured to obtain a motion parameter that the first input device performs a relative movement relative to the body device and determine a first relative movement direction that the first input device generates the relative movement relative to the body device according to the motion parameter, the first relative movement direction being used to represent a first input direction of an operation input formed in a way that the operation body controls the first input device to relatively move relative to the body device; and
  a controller located in the body device, and configured to determine an initiating instruction based on the first relative movement direction and at least control the voice collector to be in an enabled state in response to the initiating instruction, so as to collect a voice input performed by a user of the electronic apparatus.

22. The electronic apparatus according to claim 21, wherein in the case that the voice collector is in the enabled state, the detector determines according to the motion parameter whether or not the first input device stays within a first predetermined area in a first relative movement direction relative to the body device, the staying of the first input device within the first predetermined area representing a maintaining state of the operation input of the operation body;

if it is determined according to the motion parameter that the first input device stays within the first predetermined area in the first relative movement direction relative to the electronic apparatus, the controller controls the voice collector to continuously maintain in the enabled state.

23. The electronic apparatus according to claim 22, further comprising:

a second input device arranged on the first input device, wherein the second input device and the first input device are a whole and move together, the controller generates a first processing instruction in a case that leaving of the operation body is detected through the second input device after the voice collector is enabled; and the leaving of the operation body is used to represent that the input operation of the opeartion body ends up;

the electronic apparatus further comprising: a processor to perform a first processing on voice data collected during the enabled state of voice collector in response to the first processing instruction.

24. The electronic apparatus according to claim 23, further comprising:

determining through the second input device that the operation body exists during the enabled state of the voice collector;

determining a second relative movement direction that first input device performs the relative movement relative to the body device according to the motion parameter, during the enabled state of the voice collector;

the controller generates a second processing instruction, if the first input device performs the relative movement relative to the electronic apparatus in the second relative movement direction in the case that the operation body exists; and the processor abandons the voice data collected during the enabled state of the voice collector in response to the second processing instruction.

25. The electronic apparatus according to claim 22, wherein the connecting device further comprises a springback to support the first input device to recover to an initial position in a case that the operation body on the first input device leaves, during the enabled state of the voice collector, the detector determines according to the motion parameter during the predetermined first time that the first input device leaves the first predetermined area and that the first input device does not move to a second predetermined area in the second relative movement direction relative to the body device in the second relative movement direction opposite to the first relative movement direction, and the control device generates a first processing instruction;

the processor performs a first processing on the voice data collected during the enabled state of the voice collector in response to the first processing instruction;

wherein it represents that the input operation of the operation body ends up in a case that the first input device leaves the first predetermined area and recovers to the initial position through the springback.

26. The electronic apparatus according to claim 25, wherein during the enabled state of the voice collector, the detector determines according to the motion parameter during the predetermined first time that the first input device leaves the first predetermined area and that the first input device moves to the second predetermined area in the second relative movement direction relative to the body device in the second relative movement direction opposite to the first relative movement direction, and the controller generates a second processing instruction; the processor abandons the voice data collected during the enabled state of the voice collector in response to the second processing instruction.

27. The electronic apparatus according to claim 21, wherein the electronic apparatus comprises a first state and a second state, the first state being a normal operation state of the electronic apparatus, and the second state being a low power consumption state of the electronic apparatus, a display screen of the electronic apparatus being at least controlled to be in a turn-off state in a case that the electronic apparatus is in the second state; wherein processes performed by the devices are performed in the case that the electronic apparatus is in the second state or performed in the case that the electronic apparatus currently runs any application while the electronic apparatus is in the first state.

* * * * *